United States Patent
Vogeti et al.

(10) Patent No.: US 11,763,202 B2
(45) Date of Patent: *Sep. 19, 2023

(54) SHARED PREDICTION ENGINE FOR MACHINE LEARNING MODEL DEPLOYMENT

(71) Applicant: PayPal, Inc., San Jose, CA (US)

(72) Inventors: Sriharsha Vogeti, Hyderabad (IN); Anupam Tarsauliya, Hyderabad (IN); Ayaz Ahmad, Hyderabad (IN); Ravi Shanker Sandepudi, Hyderabad (IN)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,241

(22) Filed: May 27, 2022

(65) Prior Publication Data
US 2022/0398498 A1 Dec. 15, 2022

Related U.S. Application Data

(63) Continuation of application No. 17/081,586, filed on Oct. 27, 2020, now Pat. No. 11,348,035.

(51) Int. Cl.
*G06F 3/0482* (2013.01)
*G06N 20/00* (2019.01)

(52) U.S. Cl.
CPC ........... *G06N 20/00* (2019.01); *G06F 3/0482* (2013.01)

(58) Field of Classification Search
CPC .................. G06F 3/048–05; G06N 20/00
See application file for complete search history.

(56) References Cited

U.S. PATENT DOCUMENTS

| | | | |
|---|---|---|---|
| 9,704,107 B1* | 7/2017 | Baker, IV | G06Q 40/06 |
| 11,109,283 B1* | 8/2021 | Kulkarni | H04W 36/0083 |
| 2012/0053925 A1* | 3/2012 | Geffin | H05K 7/1498 703/21 |
| 2014/0245207 A1* | 8/2014 | Poulin | G06F 18/2111 715/771 |
| 2014/0280142 A1* | 9/2014 | Wasson | G06F 16/2465 707/737 |
| 2016/0253445 A1* | 9/2016 | Pataky | G06F 30/327 716/104 |
| 2018/0046926 A1* | 2/2018 | Achin | G06N 20/20 |
| 2018/0181875 A1* | 6/2018 | Motohashi | G06Q 30/0283 |

(Continued)

*Primary Examiner* — Daniel Rodriguez
(74) *Attorney, Agent, or Firm* — Haynes and Boone, LLP

(57) ABSTRACT

There are provided systems and methods for a shared prediction engine for machine learning model deployment. A service provider may provide AI hosting platforms that allow for clients, customers, and other end users to upload AI models for execution, such as machine learning models. A user may utilize one or more user interfaces provided to a client device by the service provider to select machine learning models to perform predictive services based on input features provided in an input string. Thereafter, a machine learning engine may host and execute the models during an instance of the engine provided to the client device. The engine may then process the input features in a processing thread remotely from the client device during the instance so that machine learning predictions may be determined. Thereafter, an output string for the predictions and model explanations may be provided to the client device.

20 Claims, 8 Drawing Sheets

(56) References Cited

U.S. PATENT DOCUMENTS

| | | | | |
|---|---|---|---|---|
| 2018/0322415 A1* | 11/2018 | Bendre | | G06F 9/46 |
| 2018/0349103 A1* | 12/2018 | Brown | | G06N 20/00 |
| 2019/0005411 A1* | 1/2019 | Eads | | G06F 16/2246 |
| 2019/0079962 A1* | 3/2019 | Koepke | | G06N 20/20 |
| 2019/0102700 A1* | 4/2019 | Babu | | G06N 5/025 |
| 2019/0114537 A1* | 4/2019 | Wesolowski | | G06N 3/084 |
| 2019/0155633 A1* | 5/2019 | Faulhaber, Jr. | | G06N 5/04 |
| 2019/0164080 A1* | 5/2019 | Stefani | | G06F 9/5072 |
| 2019/0197011 A1* | 6/2019 | Zavesky | | G06F 18/21 |
| 2019/0205636 A1* | 7/2019 | Saraswat | | G06N 3/042 |
| 2019/0340940 A1* | 11/2019 | Elkabetz | | G01W 1/10 |
| 2019/0354809 A1* | 11/2019 | Ralhan | | G06F 16/116 |
| 2019/0384640 A1* | 12/2019 | Swamy | | G06F 9/453 |
| 2020/0019882 A1* | 1/2020 | Garg | | G06F 21/6218 |
| 2020/0105376 A1* | 4/2020 | Lai | | G16B 50/30 |
| 2020/0204341 A1* | 6/2020 | Williams | | H04L 9/008 |
| 2020/0250556 A1* | 8/2020 | Nourian | | G06F 18/24 |
| 2020/0313849 A1* | 10/2020 | Kar | | G06N 3/08 |
| 2020/0334520 A1* | 10/2020 | Chen | | G06F 40/216 |
| 2020/0348912 A1* | 11/2020 | Katzenberger | | G06F 9/30079 |
| 2020/0379609 A1* | 12/2020 | Jacob | | G06N 7/01 |
| 2020/0380408 A1* | 12/2020 | Sridhar | | H04L 51/18 |
| 2020/0394462 A1* | 12/2020 | Hild | | G06F 11/0754 |
| 2021/0019612 A1* | 1/2021 | Carrasco | | G06N 5/01 |
| 2021/0049503 A1* | 2/2021 | Nourian | | G06N 20/20 |
| 2021/0049687 A1* | 2/2021 | Abu Libda | | G06F 16/245 |
| 2021/0081848 A1* | 3/2021 | Polleri | | G06F 8/77 |
| 2021/0089285 A1* | 3/2021 | Du | | G06F 8/447 |
| 2021/0117859 A1* | 4/2021 | Rogers | | G06N 3/045 |
| 2021/0117869 A1* | 4/2021 | Plumbley | | G06F 18/217 |
| 2021/0133850 A1* | 5/2021 | Ayush | | G06V 10/945 |
| 2021/0182729 A1* | 6/2021 | George | | G06F 9/5077 |
| 2021/0201202 A1* | 7/2021 | Simhon | | G06N 3/008 |
| 2021/0209501 A1* | 7/2021 | Sarferaz | | G06F 9/547 |
| 2021/0224687 A1* | 7/2021 | Goldszmidt | | G06F 18/2415 |
| 2021/0232934 A1* | 7/2021 | Lai | | G06N 3/126 |
| 2021/0241166 A1* | 8/2021 | Horesh | | G06F 21/602 |
| 2021/0279957 A1* | 9/2021 | Eder | | G06Q 10/06395 |
| 2021/0287430 A1* | 9/2021 | Li | | G06V 10/776 |
| 2021/0294172 A1* | 9/2021 | Rasmus-Vorrath | | E06B 9/24 |
| 2021/0295104 A1* | 9/2021 | Squires | | G06F 18/2155 |
| 2021/0295151 A1* | 9/2021 | Yoo | | G06V 10/809 |
| 2021/0295202 A1* | 9/2021 | Squires | | G06F 9/451 |
| 2021/0303934 A1* | 9/2021 | Ernest | | G06N 3/08 |
| 2021/0319894 A1* | 10/2021 | Sobol | | G06N 7/01 |
| 2021/0326782 A1* | 10/2021 | Achin | | G06F 9/5011 |

* cited by examiner

SHARED PREDICTION ENGINE FOR MACHINE LEARNING MODEL DEPLOYMENT

CROSS REFERENCED TO RELATED APPLICATIONS

This application is a continuation of U.S. application Ser. No. 17/081,586 filed Oct. 27, 2020, the contents of which are incorporated by reference in their entirety.

TECHNICAL FIELD

The present application generally relates to online digital platforms for machine learning (ML) models and more particularly to providing a prediction engine that allows end users and client devices to upload and host ML models and request predictive services from multiple ML models.

BACKGROUND

Service providers may provide artificial intelligence (AI) systems and AI models trained to determine certain predictions and decisions based on input and training data provided to the AI system. For example, a particular AI platform may be associated with fraud assessment and detection, risk prevention, natural language processing, automating chat assistance and responses, processing search queries through search engines, performing text and/or image processing and recognition, automating device operations, and the like. A machine learning (ML) and/or neural network system may train weights, attributes, and classifiers to make these decisions, which then are implemented in one or more AI prediction and/or decision services. However, implementation of ML and other AI models in existing systems is complicated and the model may be required to be converted to compliant formats. This may cause rebuilding of the model such that predictions do not hold up in a production computing environment. Data types used for feature processing may also have mismatches, and tracing problems is difficult and complex in the production computing environment. Further, once implemented, the ML model may not be compliant with other services and systems such that other users and entities may not be able utilize and implement the model. Metadata detailing the deployed ML model may also be unavailable to these other users and entities, which may make deployment of the ML model difficult in different systems.

Figure 1:
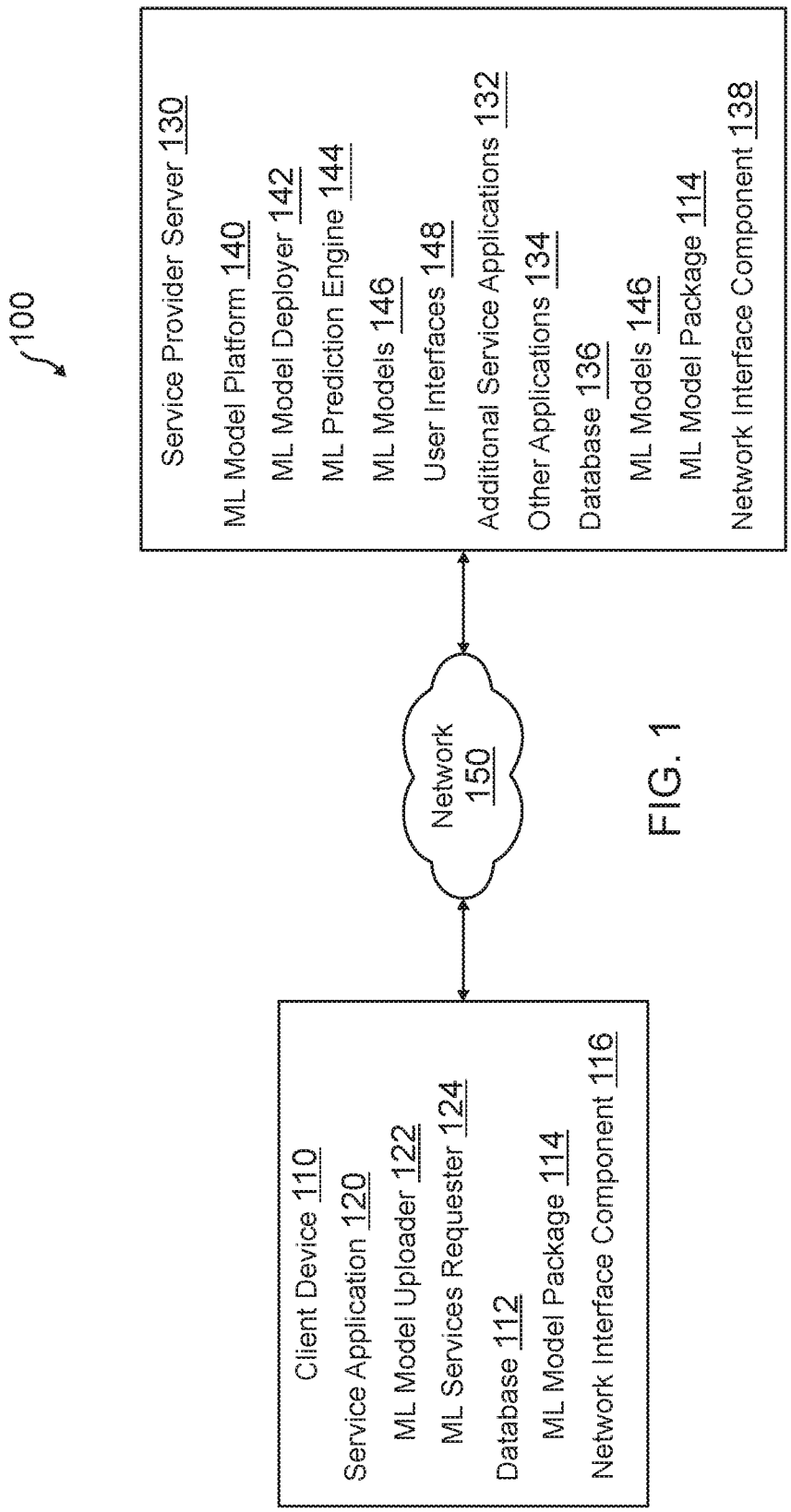
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a shared prediction engine for machine learning model deployment and a machine learning model verification for assessment pipeline deployment. Systems suitable for practicing methods of the present disclosure are also provided.

A service provider may provide an artificial intelligence (AI) prediction engine, such as a generic prediction engine, that allows for uploading, verifying, and hosting AI models on an online service platform accessible by client devices for predictive services. In this regard, the service provider may provide one or more processes to upload and verify an AI model for deployment, such as a machine learning (ML) model with an ML prediction service for one or more clients or other end users. When attempting to deploy an ML model to the prediction service, a client may utilize a client device to go through multiple upload, verification, and deployment phases. In a first phase, the client may upload one or more files, such as a compressed folder (e.g., .zip folder) having the files and corresponding data for the ML model. This may include model artifacts that allow for the ML model to be deployed. Further, the uploaded files may be in a specific format for the prediction service such that, in a second phase, the prediction service may verify that the ML model's artifacts comply with and are supported by the prediction service. The upload may also include test data that may be used to determine if predictions made by the prediction service using the model hold up and are consistent when the ML model is used in a production computing environment of the prediction service. If verified, the ML model may then be deployed and used for predictive services by the client, and other clients or end users with allowed access to the ML model. Thus, the ML model may be hosted with multiple different ML models by the prediction service.

Once hosted, the ML model may be called and utilized in predictive services during runtime of a prediction engine for the prediction service platform. In this regard, one or more user interfaces (UIs) may be provided to users, clients, and other entities to request predictive services using one or more ML models, such as to generate and provide a prediction or decision based on input data. Using the UI(s), a user may provide a prediction request to the prediction engine, with designates one or more ML models to utilize to determine the corresponding prediction. Input data and features from the data may be provided by the user via the UI(s), which may then be processed using the designated ML model(s). The ML model(s) may determine a prediction and provide an output string that includes a predictive score, value, attribute, and/or classification based on the input data and features. This may be done via the online platform and hosted ML models such that the ML models are not provided to the client device and executed locally, but instead remote and on the prediction service's online platform. This removes the need for local programming code for the ML models to be provided and executed by the client device, allowing for further integration and compatibility. Further, where the ML model(s) have an associated ML explainer, an explanation of the prediction by the ML model may be provided. This may include characteristics, parameters, and/or components of the output prediction by the ML model(s), as well as a visualization of such prediction and prediction components.

In this regard, a service provider, which may provide services to users including fraud detection, risk analysis, and the like that may be associated with electronic transaction processing by online transaction processors (e.g., PayPal®). The service provider may allow merchants, users, and other entities to establish an account to integrate and connect their various AI platforms for predictive service. A user may interact with the service provider to establish an account and provide other information for the user (e.g., consumer, merchant, service provider, or other entity). In order to utilize the computing services of a service provider, such as predictive services, the account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. In various embodiments, the service provider may also provide other computing services, including electronic transaction processing, social networking, microblogging, media sharing, messaging, business and consumer platforms, etc. The user may use the account to initially register an ML prediction service and service metadata for the service, such as information about the service, programming languages and frameworks, available models, registered and valid users, and the like.

Thereafter, once an account or other information for an ML predictive service has been registered and/or established, a user or other client entity may request use of the ML predictive service. Initially, the user may wish to upload, register, and/or deploy one or more ML models to the ML prediction service in order for the ML model(s) to be used in a live production computing environment for predictive services (e.g., to receive predictions, decisions, and other AI output based on input data and corresponding features for an ML model). In some embodiments, the ML models of the ML predictive service may be pre-registered, generated, and/or hosted by the ML predictive service. However, in other embodiments, one or more ML models may be required to be uploaded, verified, and deployed to be used with the ML predictive service.

In order to bring an ML model from the user's independent system and/or predictive services to the ML prediction service hosted and provided by the service provider (e.g., through an online platform and servers accessible by one or more client devices for the user or client), the user is first required to upload and register the model for deployment. This may correspond to a first phase such as a "Bring Your Own Model" (BYOM) operation that allows customers and clients of the service provider to host their own new models with the models provided by the service provider. To upload and register a model, the user first accesses the ML prediction service via one or more UIs, which may be provided to the user's client computing device from the online service provider platform for the ML prediction service. The user may then navigate through the UI(s) and fields, menus, and digital information provided by the UI(s). The user may select to upload an ML model and provide a folder or file with the data for the ML model.

In this regard, data for the ML model may include one or more files for model artifacts, such as those operations, weights, values, features, and resulting classifiers for the ML model. When uploading the ML model, the user may also provide a requirements text file that may designate the code packages, such as Python programming language code packages, required by the ML model so that the ML model can be executed by the online platform for the ML prediction service. The user may also provide a test data file and/or folder having test data for the ML model that may be used to verify that the ML model is making proper or accurate decisions or predictions based on input data features. For example, the test data may include input test features and resulting test predictions based on those test features. Further, the test data may also include test explanations for the test predictions that may result from an ML model explainer providing explanations for the test predictions. Any metadata for the model may also be provided, such as a model name, type, description, entity, documentation, build, configuration, and the like. The data may be provided through one or more application programming interfaces (APIs) for associated with the provided UIs, such as a model artifact upload API.

Thereafter, in a second phase, the service provider may implement verification processes to verify the ML model is valid and proper for deployment the ML prediction service. This may include whether the ML model can be hosted and utilized in a production computing environment (e.g., ML prediction engine) of the service provider. In order to validate and verify the ML model for deployment, an ML model deployer of the ML prediction service may perform a two-step process where the requirements of the ML model are first verified to be supported by the ML prediction service and engine, and second that the ML model is making proper or accurate predictions and decisions based on known input features and data (e.g., is holding up and consistent with expectations in the production computing environment of the ML prediction service). In this regard, the ML model deployer may utilize the requirements text file (e.g., a .txt file) to determine whether the code packages are supported by the programming code and ML frameworks of the ML prediction service.

For example, the ML prediction service may be provided in a programming language, such as Python, where the ML prediction service further provides one or more ML frameworks that include the libraries, interfaces, and tools to allow data scientists and developers to build, generate, and utilize ML models for predictions and decisions. These frameworks may include Tensorflow, Scikit-Learn, Python or Java H2O, and the like. Further, the ML prediction service may be provided in Python but also compatible with different client-side programming languages, code, and/or operating systems. The uploaded ML model may require code packages from these ML frameworks and code libraries, which may be designated in the requirements file. The ML model deployer may check that the required code packages are supported and provided by the frameworks and other available ML model code packages for building and executing ML models by the ML prediction service. If supported, the ML model may then be tested; however, if not, the user may be alerted of the incompatibility via the UI(s) of the ML prediction service and model deployer.

Once the ML model's requirements have been validated and verified to be supported by the ML prediction service, the ML model deployer may then utilize the test data package to determine whether the ML model is functioning as expected in the ML prediction service's computing environment and correctly performing the predictions and/or decisions based on test input features. The test data package may include test features for input data that are processed by the ML model (e.g., based on the nodes, weights, attributes, and values of the layers within the ML model) to perform predictions. Thus, some features may be provided as input to the ML model and the output decisions may be decided by the ML model from those input features. If the corresponding decisions match and/or are expected from the test data, the ML model deployer may validate the ML model for deployment. However, if not, the user may be alerted of the incorrect decisions and model prediction errors. Further, if the ML model utilizes an ML model explainer (e.g., to show, explain, and/or visualize the components and features that led the ML model to make the corresponding prediction), the ML model explainer may further provide a model predication explanation based on the test features and test prediction, which may be compared to test explanations in the test data. One or more columns of a data table for the test data may be include the test features, while another column may be designated for and include the output prediction, and a further column may be designated for and include the explanation of the output prediction.

Thereafter, the ML model may be validated to be deployed with the ML prediction service. In order to deploy the ML model, a deployment request may then be generated and issued to the ML prediction service. The deployment request may correspond to an operation to deploy and host the ML model in a live production computing environment for the ML prediction engine of the service so that predictive services may be used through the ML model. Thus, the ML model may be selected to perform predictions and decisions based on input data via one or more UIs of the ML prediction service. At certain time intervals the ML prediction service may perform operations to look for, detect, and process deployment requests, and may then deploy the corresponding ML models to the production computing environment to be used for predictive services. Thus, the ML model may not be deployed in real-time; however, real-time deployment may also be provided as an option in some embodiments. The ML model may be deployed and hosted within a directory that includes the files and data for the ML model, such as the model artifacts, metadata, and the like. The directory may correspond to a name or file path that identifies the ML model and allows for retrieval of the ML model's artifacts for execution of the ML model and determination of predictions. A UI may provide status of ML models, such as pending, deployed, and the like during the three phases of the deployment process by the ML model deployer. Once deployed, the user may also view the ML model within a UI and select an option to un-deploy the ML model. This may be done in real-time without affecting the production computing environment by removing the ML model from the pool of available models for predictive services. Un-deploying the ML model may therefore prevent the ML model from further being used to determine predictions. If un-deployed, the user or another administrator, client, or entity may also redeploy the ML model back to the production computing environment, which allows the ML model to again be used for predictive services.

Thereafter, an ML prediction engine may be provided to one or more users, clients, or customers of the ML prediction service, such as those entities that utilize the service provider for predictive services. When accessing one or more UIs of the prediction engine, a user may be presented with an option, interface field or menu, or the like where the user may submit a request for one or more predictions to be determined based on input data and corresponding features of the input data (e.g., for ML model processing and prediction or decision determination). A user may utilize the UI(s) to provide an input prediction request, where the prediction request has a certain format or structure to be processed by the ML prediction engine. The user's client device may utilize different client programming languages or codes, such as Python, Java, C, or the like, which may interface with the web application for the ML prediction application. In this regard, the web application may utilize Python, which may be compatible for different client device codes, operating systems, and operations to provide the predictive services. When the user's client device accesses the web application, an instance of the application and corresponding ML prediction engine may be launched for the client device and predictive services provided to the user. In this regard, the ML prediction engine may include thread safe and non-thread safe ML models. Where a thread safe model is used, a single instance of the ML model may be present in the ML prediction engine instance. Since the ML model is thread safe, multiple threads may access the ML model instance at the same time. However, with non-thread safe ML models, these ML models may have multiple instances instantiated in a ML prediction engine instance so that incoming prediction request may be mapped one-to-one with the ML model instances.

The instance may expose the client device to multiple ML models that may then be used for predictive services. Once an instance is launched for ML prediction engine and web application, the user may utilize one or more UIs displayed via the client device to submit a prediction request in the format required by the ML prediction service. The prediction request may include the name, directory designation, or the like of the target ML models and/or overall prediction model for predictive services. For example, the user may designate one or more ML models for processing input data and features in order to provide a prediction. This may include designating a prediction model for predictive services that includes one or multiple ML models. The prediction request further includes input data to process and perform a prediction by the ML model(s), as well as features from the input data. Such features may correspond to data that may be analyzed and processed by an ML model. The features may be determined and correspond to the input data and may include key-value pairs for the input. For example, the key-value pairs may correspond to two linked data items. The key may be a unique identifier for a data item, where the value corresponds to the data for the unique identifier and/or a pointer to the location of that data. The key-value pairs may be used for data tables, lookup tables, hash value tables, configuration files, and the like. Where multiple ML models are used for a particular prediction, such as for fraud detection and analysis, the prediction request may be executed in the instance to run the ML models concurrently using the input data and features.

The prediction request may be input as a string in a particular schema or format that allows for processing of the prediction request by the ML prediction engine. Further, since the prediction request is provided to the service provider's servers for the ML prediction engine, the prediction request may be code compliant and compatible with the programming code and language of the ML prediction service. The ML models are provided server-side so that code and frameworks for the ML models are not required to be provided to and executed by the user's client device. The ML models are therefore hosted by the ML prediction engine so that the models may be accessible by client devices over a network to provide intelligent predictive services. Thus, the ML prediction engine and ML models are supported and compatible with multiple different codes and data types for different clients. For example, the input data types for the prediction request may include numbers, strings, Boolean data, and the like, each which may be processed by different ML models and frameworks by the ML prediction engine.

Thereafter, the prediction request may be processed by the selected ML model(s) of the ML prediction engine. This may be done server-side by the ML prediction engine such that a prediction may be determined from the input data and features of the prediction request. The ML prediction engine and ML model(s) may be executed remotely from the client device by the service provider's servers and systems, such as the online computer architecture and platform of the service provider for the ML prediction engine and service. Once the prediction or other output decision is determined by the selection ML model(s), the prediction may be provided to the client device in response to the input data and features (e.g., in response to the prediction request). The prediction may be provided to the client device over a network via the UI(s) without the client device executing the ML model and system. Thus, no code is needed by the client device to deploy and execute the ML model during prediction determination. The output may be standardized to be viewed via the UI of the prediction engine, which may allow end users, data scientist, reviewers, and the like to view the resulting prediction from the input data and features.

The prediction may be output to the client device as an output string via the UI(s) of the ML prediction engine and may include a data structure in a corresponding format and/or file type. For example, the output may correspond to a JavaScript Object Notation (JSON) file format, which may be output and displayed in the UI(s). The UI(s) may therefore present the output string in the particular file format. Further, in some embodiments, the ML model(s) may be provided and/or associated with an ML explainer for the ML model. An ML explainer may correspond to an operation, process, or application that provides explanations and summaries of why a particular ML model made a certain decision or prediction, such as what features from input data were used in performing a prediction, as well as the weights or values for those features in performing the prediction (e.g., how much each feature contributed to the prediction, which may be a corresponding value, number, or weight in the prediction).

The ML explainer may therefore provide an output explanation for a prediction determined by the corresponding ML model based on input data and features. The ML explainer may therefore show why a decision or prediction was made by the corresponding ML model and may include information that shows how each feature affected the overall prediction by the ML model. The explanation may be presented as values or scores for the features and their corresponding effect in determining the prediction by the ML model. Further, a visualization may also be provided with the explanation, which may include a graph, heatmap, score/value comparison for features, and the like. Thus, the visualization may allow for users other than data scientist to conceptualize the features effect in the prediction by the ML model that processed the input data and features. For example, the explanation from the ML explainer may show why a prediction indicated fraud or exceeded a threshold value to indicate fraud for a transaction. The explanation may show the attributes, characteristics, and/or components of the prediction that predicted a certain score, class or value. Thereafter, the explanation may be output to the user via the UI(s) of the ML prediction engine, such as over a network to the client device of the user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110 and a service provider server 130 in communication over a network 150. Client device 110 may be used to access service provider server 130 over network 150 to register and deploy ML models to an ML prediction engine and service of service provider server 130. In this regard, service provider server 130 may provide one or more UIs to client device 110 that may be used to upload, validate, and deploy one or more ML models to be hosted in a live production computing environment of service provider server 130. Once hosted, service provider server 130 may provide multiple different ML models to client device 110, such as based on different programming languages, ML frameworks and libraries, and/or data types, which may then be used for predictive services. Client device 110 may then provide one or more prediction requests for the ML model(s) with input data and features, where service provider server 130 may provide predictions and associated explanations back to client device 110 when the input data and features are processed by the ML model(s).

Client device 110 and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented using any appropriate hardware and software configured for wired and/or wireless communication with service provider server 130 and/or another device or server, for example, to utilize ML services based on one or more ML models. Client device 110 may also be used for processing payments and transfers with another user, device, and/or server, which may be associated with the ML services. Client device 110 may correspond to an individual user, consumer, or merchant, or group of such entities. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains a service application 120, a database 112, and a network interface component 116. Service application 120 may correspond to executable processes, procedures, and/or applications with associated hardware. In other embodiments, client device 110 may include additional or different software as required.

Service application 120 may correspond to one or more processes to execute modules and associated devices of client device 110 to provide a convenient interface to permit a user for client device 110 to enter, view, and/or utilize ML models and other AI services for an intelligent platform of service provider server 130. In this regard, service application 120 may correspond to specialized hardware and/or software utilized by client device 110 to allow a user to enter and/or select ML models for use with service provider server 130. For example, a user interface (UI) of an ML model uploader 122 may present one or more fields and operations for uploading and deployment of an ML model to an ML prediction engine of service provider server 130. This may include a data package that includes the model artifacts necessary to deploy the ML model, such as the trained layers, nodes, weights, values, and/or classifiers for the ML model. The data package provided via ML model uploader 122 may further include a requirements file that designates the code packages necessary to deploy, host, and use the ML model via an ML model framework (e.g., Tensorflow, Scikit-Learn, H2O, CatBoost, XGBoost, LightGBM, etc.). The requirements file may be used to validate that the ML model can be deployed by service provider server 130. The data package may also include test data, such as test features and test input with corresponding test output values, classifications, and/or predictions. Once the ML model is deployed, a result of the deployment (e.g., deployment status) may be viewed via the UIs of ML model uploader 122, as well as an option to un-deploy the ML model and remove from selection and use in a production computing environment for ML model prediction services of service provider server 130.

Thereafter, service application 120 may further be used to request predictions and decisions through an ML prediction engine and platform of service provider server 130 through an ML services requester 124. This may correspond to predictive services to provide an output based on input data, such as a risk analysis, fraud detection, rule or regulation compliance, and/or other predictive services (e.g., which may be associated with a service provider by service provider server 130 or another related service provider). ML services requester 124 may be used to provide a prediction request using an ML model and ML prediction engine of service provider server 130. The prediction request may include designation of one or more ML models for a prediction, which may be provided through an instance of the ML prediction engine and within a single computing thread so as to maintain thread safety. Further, the prediction request may include input data for processing by the designated ML models, as well as features from the input data that are processed by the nodes and layers of the ML models. Thereafter, ML services requester 124 may be used to view the results of processing input data and input features, such as the output prediction. Further, an ML model explainer for the ML model and corresponding prediction may provide an output explanation with the prediction via service application 120. The explanation may provide data and/or visualizations as to the features, components, scores, values, and the like that caused the resulting prediction.

In various embodiments, service application 120 may correspond to a general browser application configured to retrieve, present, and communicate information over the Internet (e.g., utilize resources on the World Wide Web) or a private network. For example, service application 120 may provide a web browser, which may send and receive information over network 150, including retrieving website information, presenting the website information to the user, and/or communicating information to the website, including messages and/or transaction and payment information transmitted between different parties and entities. However, in other embodiments, service application 120 may include a dedicated application of service provider server 130 or other entity (e.g., a merchant), which may be configured to assist in processing transactions electronically, such as a peer-to-peer payment application associated with a peer-to-peer messaging and payments.

In this regard, service application 120 may provide transaction processing for the items, such as through a UI enabling the user to enter and/or view the items that the user associated with client device 110 wishes to purchase. Service application 120 may also be used by a user to provide payments and transfers to another user or group of users. For example, service application 120 may utilize user financial information, such as credit card data, bank account data, or other funding source data, as a payment instrument when providing payment information. Additionally, service application 120 may utilize a digital wallet associated with an account with a payment provider as the payment instrument, for example, through accessing a digital wallet or account of a user through entry of authentication credentials and/or by providing a data token that allows for processing using the account. Thereafter, when processing a transaction or sending a payment/transfer, service application 120 may employ the use of ML prediction services of service provider server 130. Service application 120 may also or instead provide instant messaging, email, SMS/MMS messaging, social networking posts and data feeds, microblogging, media sharing, and the like for transmitting messages.

Client device 110 may further include database 112 which may include, for example, identifiers such as operating system registry entries, cookies associated with service application 120 and/or other applications 114, identifiers associated with hardware of client device 110, or other appropriate identifiers. Identifiers in database 112 may be used by a payment/service provider to associate client device 110 with a particular account maintained by the payment/service provider. Database 112 may also further store an ML model package 114, which may be uploaded via an ML model uploader 122 of service application 120. In this regard, ML model package 114 may include ML model artifacts for an ML model, requirements for ML framework code and code packages, and test data used to validate the ML model.

Client device 110 includes at least one network interface component 116 adapted to communicate with service provider server 130 over network 150. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for AI services, such as predictions from an ML prediction engine and platform. In this regard, service provider server 130 includes one or more processing applications which may be configured to interact with client device 110 to facilitate deployment of AI models and use of AI services. In one example, service provider server 130 may be provided by PAYPAL®, Inc. of San Jose, Calif., USA. However, in other embodiments, service provider server 130 may be maintained by or include another type of service provider.

Service provider server 130 of FIG. 1 includes an ML model platform 140, additional service applications 132, other applications 134, a database 136, and a network interface component 138. ML model platform 140 and additional service applications 132 may correspond to executable processes, procedures, and/or applications with associated hardware. In other embodiments, service provider server 130 may include additional or different modules having specialized hardware and/or software as required.

ML model platform 140 may correspond to one or more processes to execute modules and associated specialized hardware of service provider server 130 to provide predictive services to users through one or more platforms to deploy, host, and utilize ML models. In this regard, ML model platform 140 may correspond to specialized hardware and/or software used by service provider server 130 to first deploy ML models through an ML model deployer 142, which allows users to upload an ML model, verify the model, and thereafter have the model deployed and hosted for use. In this regard, ML model deployer 142 may provide one or more of user interfaces 148 to client device 110 in order to upload ML model package 114 from client device 110 to service provider server 130. ML model package 114 may include model artifacts and other data to deploy an ML model via an ML model deployer 142, where ML model platform 140 may provide the corresponding ML model with ML models 146 for use.

For example, ML models 146 may be generated based on training data. When building ML models 146, the training data may be used to generate one or more classifiers and provide recommendations, predictions, or other outputs based on those classifications and an ML model algorithm and framework. For example, ML models 146 may include one or more layers, including an input layer, a hidden layer, and an output layer having one or more nodes; however, different layers may also be utilized and as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models 146.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML models 146 that provides a prediction, decision, recommendation, or classification. Thus, when ML models 146 are used to perform a predictive analysis and output, the input may provide a corresponding output based on the classifications trained for ML models 146.

By providing training data to ML model platform 140 to train ML models 146, the nodes in the hidden layer may be trained (adjusted) such that an optimal output (e.g., a classification) is produced in the output layer based on the training data. By continuously providing different sets of training data and penalizing ML models 146 when the output of ML models 146 are incorrect, ML models 146 (and specifically, the representations of the nodes in the hidden layer) may be trained (adjusted) to improve its performance in data classification. Adjusting ML models 146 may include adjusting the weights associated with each node in the hidden layer. Further, where the user later onboards with service provider server 130 to generate and/or deploy an ML model, ML models 146 may be trained by retrofitting the models based on the currently trained model, inputs, and classifications. ML model deployer 142 may thereafter receive artifacts for these trained ML models in a data package, such as ML model package 114, with a requirements file (e.g., a text file designating the code packages of an ML framework that are required for deploying the ML model). Test training data or other test inputs, features, and corresponding output predictions may also be provided with the data package to ML model deployer. This uploading phase may correspond to a first phase for deploying an ML model.

Thereafter, in a second phase of ML model deployment, ML model deployer 142 may verify and validate the ML model package and data. This may correspond to using the requirements file to determine whether the ML frameworks used and provided by ML model platform (e.g., Tensorflow, Scikit-Learn, H2O, or the like) are capable of deploying the corresponding ML model. Thus, ML model deployer 142 in this phase may verify that ML model platform 140 has the system capabilities, programming code and code packages, and/or system resources required by the ML model. Additionally, the ML model may be tested by ML model deployer 142 using the test data, for example, by inputting the input features for the test data and verifying whether the corresponding predictions or decisions in the test data result for the input features. If properly validated and verified, ML model deployer 142 may then request deployment of the ML model to ML prediction engine 144 with ML models 146. The ML model may be deployed at certain intervals, and a deployment status may be updated. Additionally, one or more of user interfaces 148 may be used to un-deploy the ML model and remove the ML model from a live production computing environment for prediction services.

Once ML models 146 have been generated, ML model platform 140 may provide ML functionalities and prediction services through ML prediction engine 144 and ML models 146. Thus, ML prediction engine 144 may provide one or more of ML models 146 for selection and use through one or more of user interfaces 146. This may include performing a risk analysis or fraud detection, operating a computing device, providing a marketplace recommendation, providing a search result, operating a device, or other AI predictive outputs. Client device 110 may provide an input data string or request that identifies the corresponding ones of ML models 146 for use to perform a prediction. The input data string may include input data for processing having input features used by the selected ones of ML models 146 to perform a prediction. This may be done through an instance of ML prediction engine 144 provided to client device 110, where a single processing thread may be used to ensure thread safety during data processing. Thereafter, the resulting prediction may be output to the user of client device 110 via user interfaces 148. Further, if one or more of ML models 146 have a corresponding ML explainer, an ML prediction explanation may be output to client device 110 via user interfaces 148.

Additional service applications 132 may correspond to one or more processes to execute modules and associated specialized hardware of service provider server 130 to provide services to users, such as services to process a transaction and/or provide payments. In this regard, additional service applications 132 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. In some embodiments, the financial information may also be used to establish a payment account and provide payments through the payment account. The payment account may be accessed and/or used through a browser application and/or dedicated payment application, which may include AI functionalities and prediction services provided by ML model platform 140. Additional service applications 132 may process the payment and may provide a transaction history for transaction authorization, approval, or denial. Additional service applications 132 may also or instead be used to provide social networking, microblogging, media sharing, messaging, business and consumer platforms, and the like.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include additional connection and/or communication applications, which may be utilized to communicate information to over network 150.

Additionally, service provider server 130 includes database 136. Database 136 may store various identifiers associated with ML models, client devices, and/or external platforms. Database 136 may also store account data, including payment instruments and authentication credentials, as well as transaction processing histories and data for processed transactions. Database 136 may store training data, ML model artifacts, ML framework data and code packages, and/or ML models, such as ML models 146 deployed to ML model platform 140, as well as ML model package 114 uploaded, verified, and deployed from client device 110. Additionally, data generated by ML model platform 140 may be stored by database 136, such as predictions and decisions determined based on prediction requests having input data and input features.

In various embodiments, service provider server 130 includes at least one network interface component 138 adapted to communicate with client device 110 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
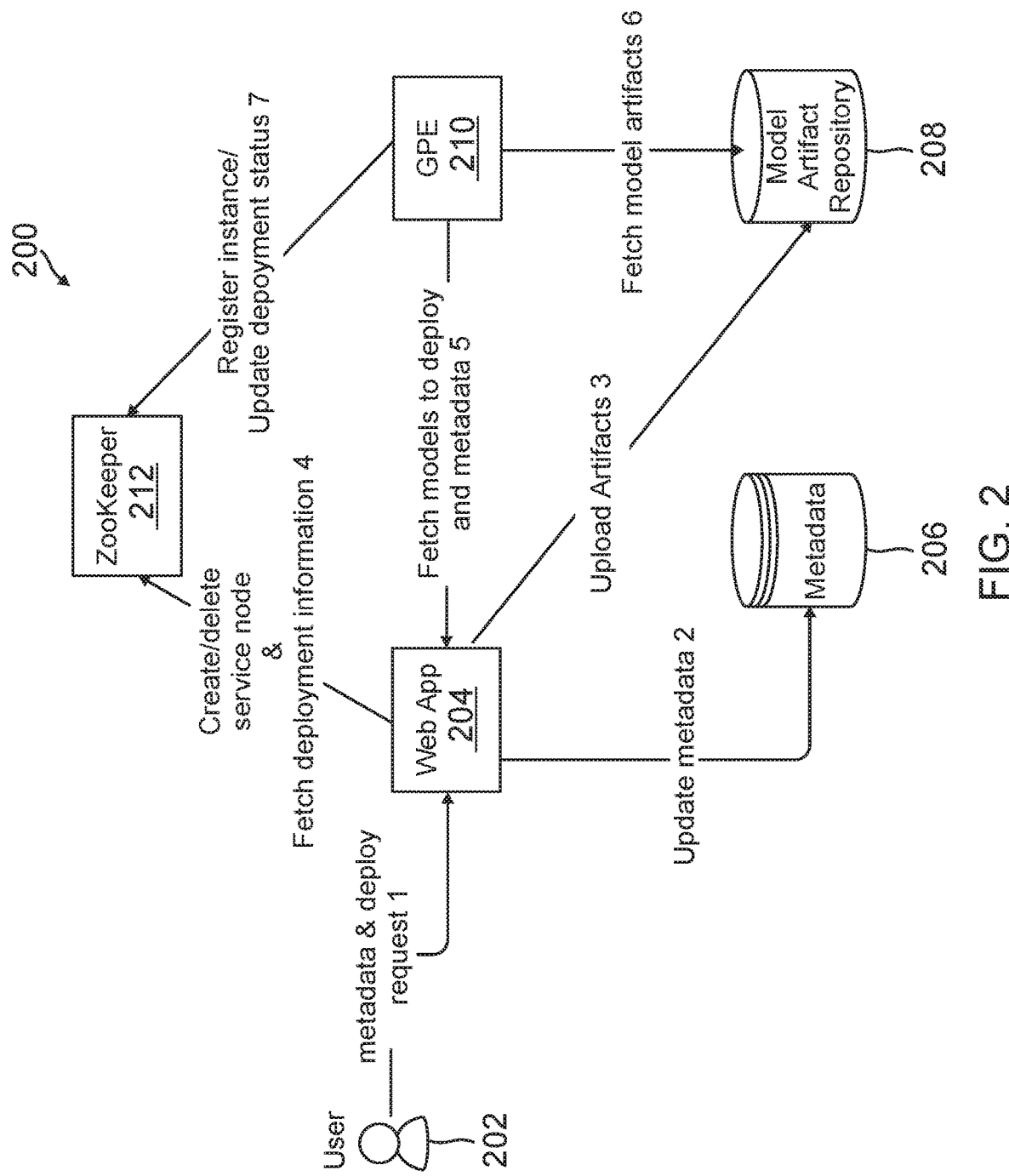
FIG. 2 is an exemplary block diagram of a system for verifying and deploying a machine learning model of a client entity, according to an embodiment.

FIG. 2 is an exemplary block diagram 200 of a system for verifying and deploying a machine learning model of a client entity, according to an embodiment. Diagram 200 of FIG. 2 includes a user 202 interacting with an online system for uploading, validating, and deploying models to an online ML prediction engine and platform, such as one provided by service provider server 130 discussed in reference to system 100 of FIG. 1. In this regard, diagram 200 includes the operations and components of ML model platform 140 for service provider server 130 from system 100, which may be used to communicate with user 202 during ML model deployment.

In diagram 200, user 202 initially provides ML model metadata and a deploy request, at step 1, to a web application 204 for the ML model deployer and ML prediction platform. For example, ML model deployer 142 from system 100 may provide web application 204 that provides a portal, UIs, and a web service to allow for user 202 to provide an ML model deployment request, such as a request to deploy a data package associated with an ML model. The data package may include the ML model artifacts for the ML model to be deployed, a requirements file for required code packages needed from a corresponding ML framework to deploy the ML model, and test data needed to validate that the ML model is functioning as expected and performing correct predictions in a live computing environment for the ML model engine and platform. ML model artifacts may correspond to the outputs caused by the training data, such as the specific predictions, classifications, recommendations, decisions, and the like that result from the layers of the ML model that are trained, calculated, and adjusted based on the training data. For example, the layers, including input, hidden, and output layers, may each have one or more nodes interconnected to adjacent (e.g., preceding and subsequent) layers having values, weights, or the like that are trained based on the ML algorithm.

Thereafter, at step 2, web application 204 interacts with metadata 206 to update and store the metadata for the ML model in a data store for metadata 206. The metadata for the ML model may include a programming code and/or type used by the ML model, a description of the ML model, the corresponding input data and features processable by the ML model with corresponding output predictions, a model build or version number, and the like. At step 3, web application 204 then uploads and stores the model artifacts for the ML model to a model artifact repository 208, which may be accessed when the ML model is to be deployed and/or requested for predictive services. For example, the ML model artifacts in model artifact repository 208 may be accessed and used when the ML model is validated, as well as during later predictive services, in order to perform predictions based on input data and features. Further, when artifacts are uploaded, they may be associated with a model name, directory and directory name, model registration, and updates to the model.

At step 4, web application 204 interacts with a zookeeper 212 to create and/or delete service nodes for model deployments and fetch deployment information. This may include creating a service node that allows for deployment of an ML model, viewing of validation/verification status, and deployment status once the ML model is validated. Zookeeper 212 may correspond to a central store for live information related to the ML prediction service, engine, and platform, which includes information about current status of model deployments for each instance of the ML model engine provided to users, such as user 202. During and/or after step 4, a GPE 210 may fetch models to deploy and metadata for those models, at step 5. GPE 210 may correspond to a generic prediction engine, such as an ML prediction engine for multiple different ML models, including those previously deployed and currently uploaded and verified for deployment. Thus, GPE 210 may interact with zookeeper 212 in order to provide ML model deployment statuses and determine any deployment requests, as well as to assist in providing instances of the ML model deployer and ML prediction engine, and corresponding data, to users including user 202.

When performing step 5 in order to fetch models to deploy and their corresponding metadata, at step 6, GPE 210 fetches model artifacts from model artifact repository 208. GPE 210 may fetch the model artifacts in order to deploy the ML model requested by user 202. The model artifacts may initially be fetched to test the ML model using test data of the ML model, such as by ensuring test input and test features result in test output and predictions expected by the ML model's artifacts. Additionally, the requirements file for the ML model provided in the deployment request of the ML model may further be used by GPE 210 to determine whether the ML model is supported by, and can be deployed, using the ML model frameworks and corresponding code packages of GPE 210 (e.g., used and supported by GPE 210 for ML model hosting and predictive services). Thereafter, based on the deployment actions and statuses, at step 7, GPE 210 registers an instance and/or updates deployment status of the ML model with zookeeper 212 so that user 202 may view deployment status, as well as utilize the instance of the deployed ML model (with GPE 210) for ML predictions and predictive services.

Figure 3A:
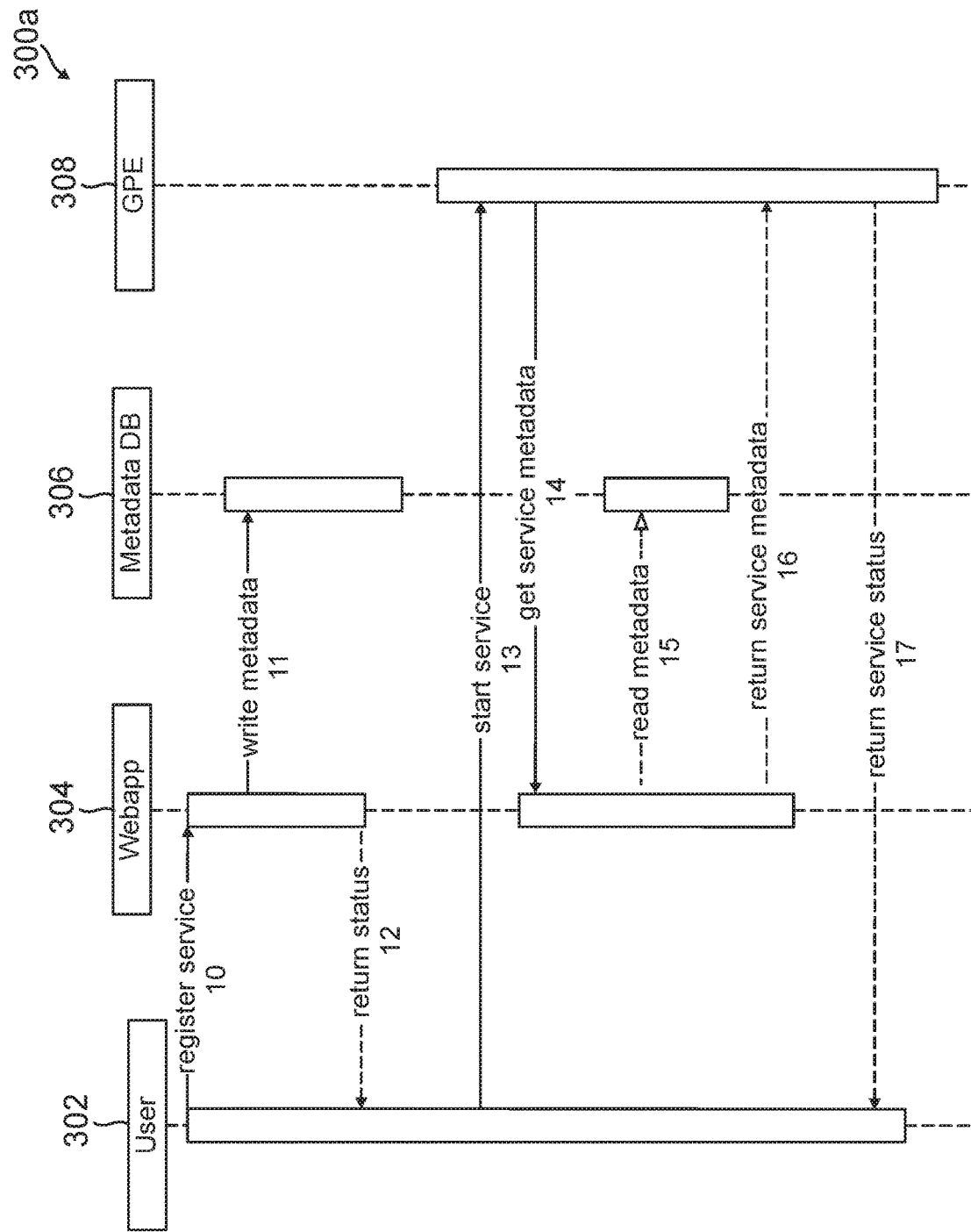
FIG. 3A is an exemplary communication diagram of devices interacting when registering service metadata for a prediction service, according to an embodiment.

FIG. 3A is an exemplary communication diagram 300a of devices interacting when registering service metadata for a prediction service, according to an embodiment. Diagram 300a shows an exemplary process and communications utilized between entities and devices in order to perform a service registration for an ML prediction service, such as one provided by an ML prediction engine and platform provided by service provider server 130 discussed in reference to system 100 of FIG. 1. Diagram 300a includes operations and components implemented and executed by ML model platform 140 of service provider server 130 from system 100.

In diagram 300a, a user 302 may interact with a web application 304 in order to register the ML prediction service for hosting ML models and utilizing those models for predictive services. Web application 304 may provide a host and UIs that manage interactions by user 302 with one or more other internal computing services. Thus, web application 304 may host the endpoints related to an ML model repository and ML model deployer/engine. In this regard, at step 10, user 302 provides a register service request to web application 304, which requests registration of the service in order to begin deploying, hosting, and using different ML models. This may include providing metadata for the service, such as the different aspects of the ML service (e.g., compatible programming codes, ML model frameworks, accessibility options, verified or registered users, and the like). At step 11, the metadata is stored by web application 304 written to metadata database 306 for the ML prediction service that user 302 is requested for registration.

At step 12, a status for service registration is returned to user 302, where the status displays to the user that the service is registered. Service registration status may be displayed through one or more UIs for web application 304. Thereafter, user 302 may request to start the ML prediction service with GPE 308 so that the ML prediction service may be executed via an instance with the client device used by user 302. GPE 308 may correspond to a generic prediction engine, such as an ML prediction engine for multiple different ML models, including those requested for deployment by user 302. The instance may be provided so that a single thread for multiple ML models may be executed when ML models are used for the ML prediction service. This allows for ensuring thread security and safety, as well as allowing multiple different instances to different client devices for hosting and executing ML model for predictive services.

Thereafter, GPE 308 requests to get the service metadata from web application 304 in order to provide the instance of the ML prediction service to user 302. Web application 304 reads the service metadata from metadata database 306 at step 15. The service metadata may be read in order to return a service status and other data through the service instance to user 302. The service metadata is returned by web application 304 to GPE 308, at step 16, in order to host the instance of the ML prediction service by GPE 308. Thereafter, GPE 308 returns a service status to user 302 via their computing device, at step 17, which allows for hosting of the instance of the ML prediction service for uploading and deploying ML models, as well as using the ML models for predictive services.

Figure 3B:
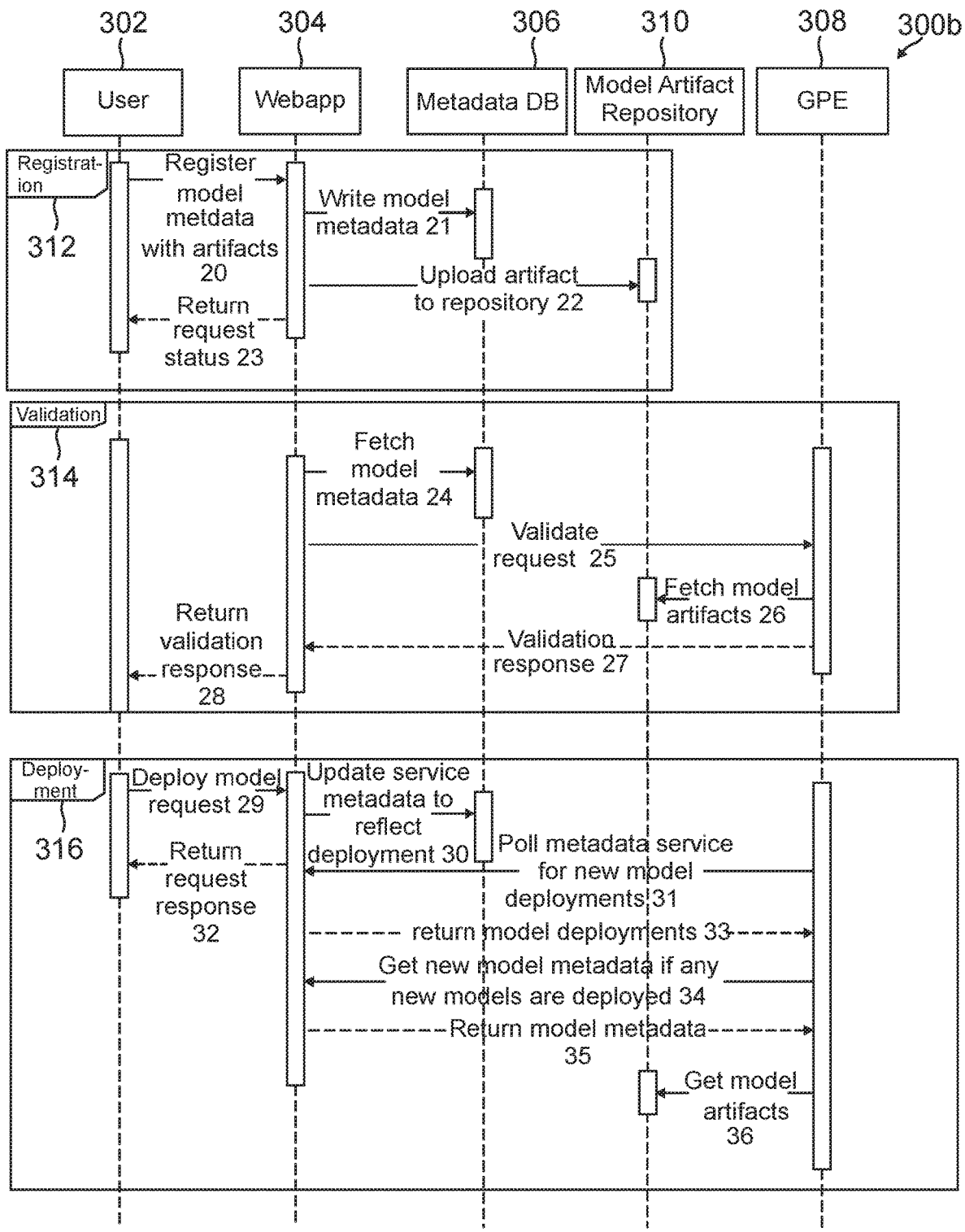
FIG. 3B are exemplary communication diagrams of device interacting when registering machine learning model metadata and deploying the machine learning model, according to an embodiment.

FIG. 3B are exemplary communication diagrams 300b of device interacting when registering machine learning model metadata and deploying the machine learning model, according to an embodiment. Diagram 300b shows an exemplary process and communications utilized between entities and devices in order to register, validate, and deploy an ML model to an ML prediction service, such as one provided by an ML prediction engine and platform provided by service provider server 130 discussed in reference to system 100 of FIG. 1. Diagram 300b includes operations and components implemented and executed by ML model platform 140 of service provider server 130 from system 100.

In diagram 300b, a model deployer, such as ML model deployer 142 in system 100, may be used to deploy an ML model to an ML prediction service for predictive services. In this regard, an initial registration phase 312 may be used to initially upload and register model data for an ML model. At step 20 of registration phase 312, model metadata with artifacts are provided to web application 304 in order to be registered with GPE 308, such as the ML prediction engine of the ML prediction service. The model metadata may include information about the ML model, such as required programming code of frameworks, model version, model description, and the like. The model artifacts may correspond to those outputs caused by the ML model based on the training data, such as the trained predictions, classifications, decisions, recommendations, and the like that result from the ML models trained layers using an ML model algorithm and technique with the training data.

Thereafter, web application writes the model metadata to metadata database 306, at step 21. Web application further uploads the model artifacts to a model artifact repository 310, at step 22. Model artifact repository 310 may correspond to a database or store that allows for storage of model artifacts that are used during validation of the ML model and later hosting and use of the ML model for predictive services. For example, the ML model artifacts in model artifact repository 210 may be accessed and used when the ML model is validated, as well as during later predictive services. Registration phase 312 ends, at step 23, with a return request status that is provided by web application 304 to user 302, which may provide an initial status to user 302 that registration phase 312 is complete and a validation phase 314 may begin to validate the ML model's requirements and artifacts for proper deployment and predictions.

During validation phase 314, web application 304 initially fetches the model metadata from metadata database 306 in order to perform validation of the ML model, at step 24. The model metadata for the ML model may include a requirements file, such as a .txt file that lists the code packages (e.g., Python libraries) that are required by the ML model in order to be deployed and properly function with GPE 308. This may include the code packages that are provided by an ML model framework in order to provide the different layers, nodes, and ML techniques for the ML model via programming code. Web application, at step 25, may validate a request to deploy the ML model with GPE 308 by confirming that the ML model and corresponding data package is compatible with and supported by GPE 308. For example, GPE 308 may be analyzed to determine that the available code, code packages, and ML model frameworks properly can host and support use of the ML model. Validation phase 314 may include a first portion or sub-phase that first validates that GPE 308 can execute the ML model's requirements.

At a second portion or sub-phase of validation phase 314, GPE 308 then verifies that the ML model is returning proper results and predictions when hosted and executed in the live production computing environment of GPE 308. For example, GPE 308 may determine whether an instance of the ML model engine and prediction services is returning expected predictions using the ML model. Thus, at step 26, model artifacts are fetched from model artifact repository 310 by GPE 308 in order to test the ML model as performing proper decision-making and predictions. With the model artifacts, the initial data package for the ML model (e.g., the ML model artifacts and metadata associated with ML model requirements and test data) may be accessed for test data that is utilized to validate the ML model as providing proper predictions. For example, test data for the model may include test input and corresponding test features that are input to the ML model, along with test predictions or other output that should result from the test input and features. Further, the test data may also include test explanations from an ML model explainer that generates these test explanations from the test predictions. This allows for confirming whether the ML model is properly behaving in the computing environment of GPE 308. At step 27, GPE 308 then provides a validation of the ML model response to web application 304, which indicates whether the ML model is supported by GPE 308 and returning proper or expected predictions. Web application then, at step 28, provides and returns the validation of the ML model as a response to user 302, which may be provided through one or more UIs that displays whether validation of the ML model was successful.

If successful, during a deployment phase 316, user 302 provides a deploy model request to web application 304, at step 29. The deploy request may be provided via a UI selection or input that requests the ML model to be deployed into the live production computing environment of GPE 308. Thereafter, at step 30, service metadata for the ML prediction service is updated by web application 304 with metadata database 308 to reflect the request to deploy the ML model so that the service will reflect that the ML model is active and available for predictive services. The deployment request may be held for scheduled intervals of GPE 308 to deploy new ML models and/or re-deploy inactive ML models. At step 31, GPE 308 polls the metadata service of web application 304 for new models to deploy to GPE 310. At step 32, a request response is returned to user 302. Web application 304 returns to GPE 308 the new ML model deployment requests, at step 33, in order to have new ML models deployed.

At step 34, GPE 308 may also get any new model metadata from web application 304 if any new model is deployed. The model metadata may be obtained by GPE 308 in order to provide the model description, version, or other metadata with the ML model when the ML model is hosted and available for use with GPE 308. At step 35, the model metadata is returned to GPE 308, which causes GPE 308 to get the model artifacts from model artifact repository 310, at step 36. The model artifacts may be used by GPE 308 in order to deploy and host the ML model for predictive services. Further, after step 36, user 302 may request that deployed models be un-deployed via one or more UIs, which may remove the ML models from the live production computing environment of GPE 308. This may be done in real-time to remove the ML models from predictive services, such as if a model is detected as behaving incorrectly (e.g., not providing expected predictions) or has errors.

Figure 4:
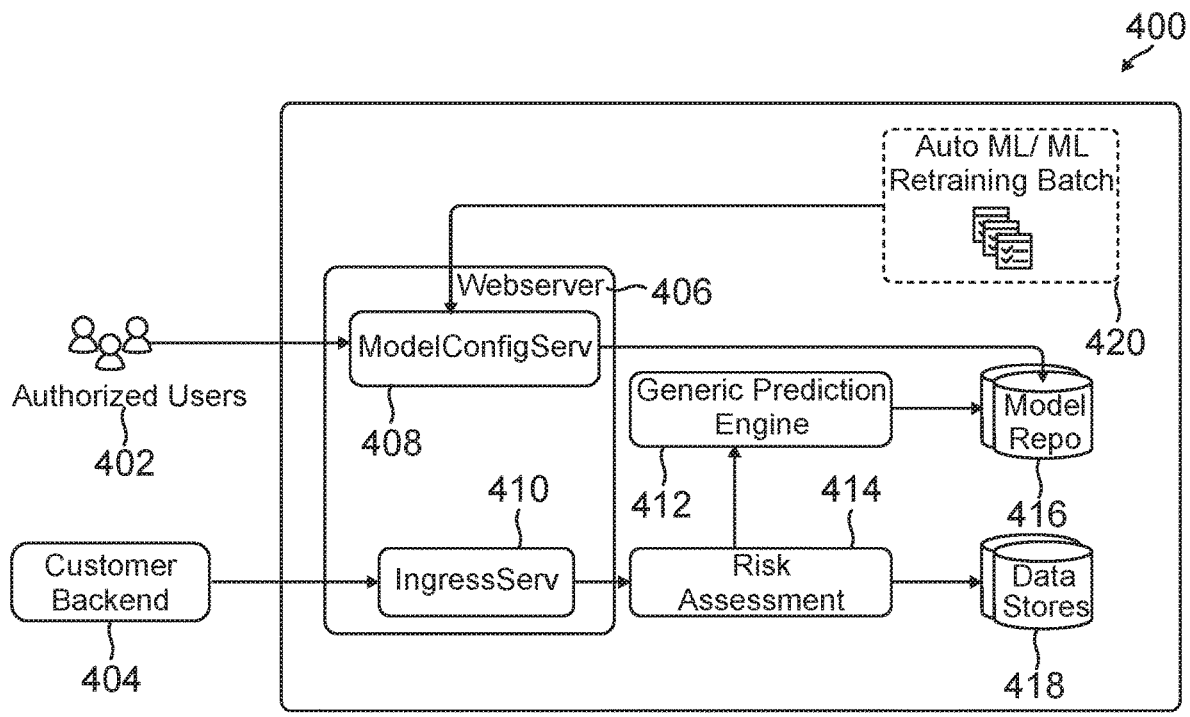
FIG. 4 is an exemplary block diagram of a prediction engine used to perform predictions from one or more machine learning models registered with the system, according to an embodiment.

FIG. 4 is an exemplary block diagram 400 of a prediction engine used to perform predictions from one or more machine learning models registered with the system, according to an embodiment. In diagram 400, authorized users 402 may interact with a web server 406 in order to register, validate, and deploy ML models to an ML prediction service, such as an engine and platform of service provider server 130 discussed in reference to system 100 of FIG. 1. For example, authorized users 402 may be a set of users that may provide ML models to the ML prediction engine and platform in diagram 400 to allow for predictive services.

In this regard, authorized users 402 may interact with a ModelConfigServ 408 of web server 406 in order to provide model deployment services. ModelConfigServ 408 may correspond to a configuration service, resource, and/or object that allows authorized users 402 to upload ML models, validate those ML models, and thereafter deploy those models for ML predictions using the ML models, for example, as discussed in reference to FIGS. 2-3B. ModelConfigServ 408 may then store data for the ML models, such as metadata and/or model artifacts, to a model repository 416, that may include one or more databases or data stores for this metadata and artifacts. Thereafter, web server 406 may provide one or more UIs and/or services for utilizing these ML models.

S customer backend 404 may then interact with an IngressServ 410 in order to request predictive services, such as by providing an input prediction request string or other data. IngressServ 410 may correspond to an ingress service, resource, and/or object that may allow outside communications (e.g., HTTP/HTTPS communications) to be routed from these outside clients to the internal components and services of the ML prediction engine and platform shown in diagram 400. In various embodiments, the prediction request from or by a user, device, or service of customer backend 404 may be provided in a predefined data structure in order to optimize communications and provide lower latencies between client and server devices. The data package may be provided for a prediction request from customer backend 404 to IngressServ 410 for risk assessment 414 using a generic prediction engine 412. Generic prediction engine 412 may then access model repository 416 in order to fetch model artifacts and other model data (including model metadata) to perform a prediction. Generic prediction engine 412 may be provided as a single instance to the requesting client providing the prediction request. This instance allows for the prediction request to designate multiple models in a single thread for prediction services. In this regard, the single thread may allow for thread safety so that multiple threads and ML models are not run at once, which may cause issues in data consistency between different threads and ML models. Further, multiple instances of generic prediction engine 412 may be provided to multiple different clients and devices at the same time to allow for different predictive services.

Further, data stores 418 may be used to store predictions, as well as additional input data and features for those predictions, so that previous predictions and other decision-making by the ML models hosted by generic prediction engine 412 may be used for viewing, risk/fraud assessment, and/or retraining. In this regard, an Auto ML/ML Retraining Batch processor 420 may provide an automated process to train and retrain ML models based on data stored from past uses of predictive services of the ML prediction engine and platform in diagram 400. Auto ML/ML Retraining Batch processor 420 may use data from data stores 418 to retrain an ML model over time, such as if the model is required to be trained on new or updated data to maintain a certain degree or threshold of correct predictions. This may include where the ML models use a continuous training ML technique and algorithm. Further, in additional embodiments, Auto ML/ML Retraining Batch processor 420 may be used to automatically train an ML model using available training data for inputs, features, and predictions so that authorized users 402 may not be required to supply training data and trained model artifacts.

Figure 5:
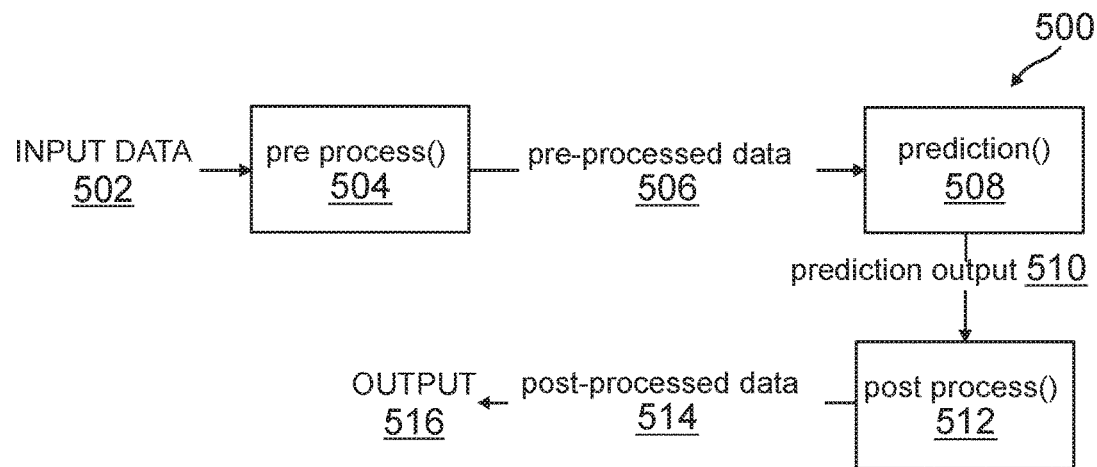
FIG. 5 is an exemplary communication diagram of output predictions and explainers of the output predictions performed by a prediction engine from input data, according to an embodiment.
Figure 5:
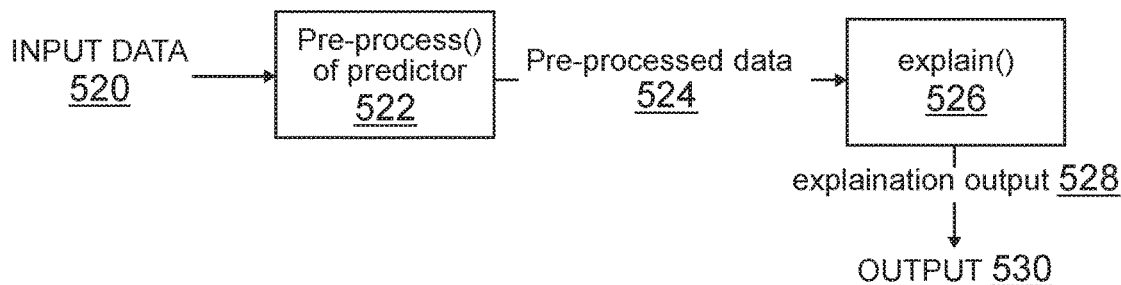

FIG. 5 is an exemplary communication diagram 500 of output predictions and explainers of the output predictions performed by a prediction engine from input data, according to an embodiment. Diagram 500 shows an exemplary process and communications utilized between entities and devices in order to provide an ML prediction and ML model explanation from an ML prediction service, such as one provided by an ML prediction engine and platform provided by service provider server 130 discussed in reference to system 100 of FIG. 1. Diagram 500 includes operations and components implemented and executed by ML model platform 140 of service provider server 130 from system 100.

In diagram 500, two different input data types are provided that result in an ML prediction output, and explainer of the ML prediction output, such as why the corresponding ML model made the prediction (e.g., what features did the ML model rely on to make the prediction and how heavily was that feature scored or otherwise relied on in the prediction). In this regard, input data 502 is provided to an ML model hosted by an ML prediction engine and platform that provides predictive services. Input data 502 may correspond to some data for processing in order to perform a predictive analysis, such as if the data indicates risk or fraud. Input data 502 goes through a pre-process phase 504, where input data 502 is converted to data to be processed by the ML model. This may include feature extraction to extract the features from input data 502 that may be provided to an input layer of an ML model. Thus, pre-processed data 506 may include the features derived from input data 502 for processing.

Thereafter, pre-processed data 506 is provided to the ML model and corresponding engine during a prediction phase 508, which processes pre-processed data 506 via the layers of the corresponding ML model (which may correspond to multiple model used during an instance of the ML prediction engine). Prediction phase 508 results in a prediction output 510, which provides a corresponding prediction, such as a classification of whether input data 502 indicates risk or fraud. Prediction output 510 thereafter goes through a post-process phase 512, where the corresponding prediction is processed in order to provide prediction output 510 to the client in response to input data 502. Post-processed data 514 is then output by the ML model and engine so that an output 516 may be provided for the corresponding prediction. Both input data 502 and output 516 may be provided in a predefined data structure in order to optimize communications and provide lower latencies between client and server devices. For example, the input and output strings may be provided through the same programming language, web server and application, and/or UIs in order to provide faster data processing and lower latencies in data communication.

In a similar manner, input data 520, which may correspond to input data 502 and/or a subset or conversion of input data 502, may be utilized with an ML model explainer to provide an ML model explanation of a prediction performed by the ML model. The explanation may provide an indication to a reviewing entity of why the model acted in the particular manner to make the corresponding prediction, such as what features where relied on and to what degree. Preprocess of predictor phase 522 may then process this data in order to determine the corresponding pre-processed data 524 having the features or other data used by the ML model and predictor for a prediction. Pre-processed data 524 may be provided to the ML model explainer, at explainer phase 526, in order to process the data and provide an explanation of the ML model's prediction. An explanation output 528 may then be provided by the ML model explainer, which may be provided to the user as output 530. Output 530 may include different data, measurements, feature identifications and weights used in the prediction, as well as a visualization of those corresponding components and weights in the prediction (e.g., a bar graph, comparison, or the like of the components in the prediction).

Figure 6:
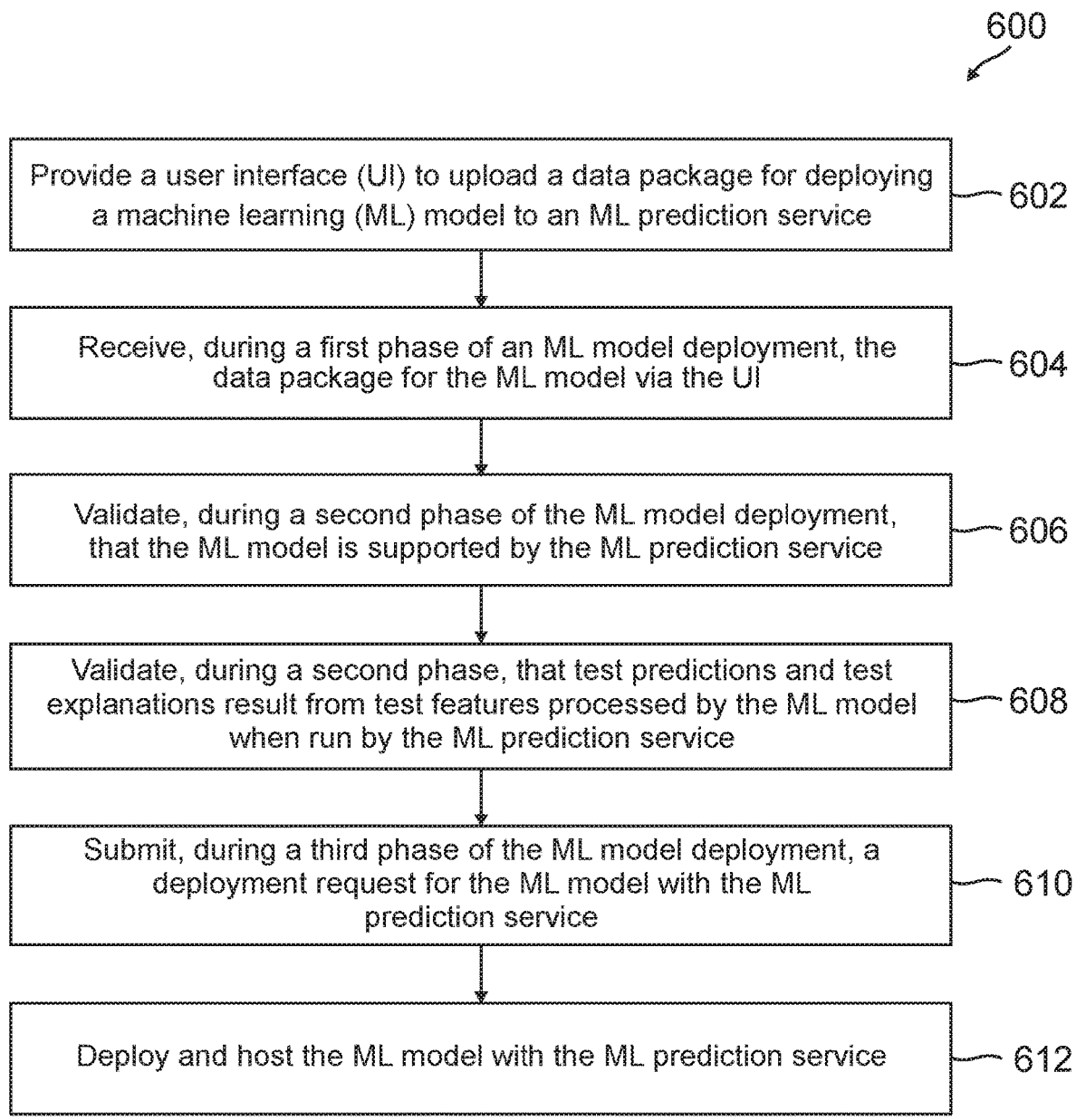
FIG. 6 is a flowchart for a machine learning model verification for an assessment pipeline deployment, according to an embodiment.

FIG. 6 is a flowchart 600 for a machine learning model verification for an assessment pipeline deployment, according to an embodiment. At block 602 of flowchart 600, a user interface (UI) is provided that enables a user or client (e.g., using a client device) to upload a data package for deploying a machine learning (ML) model to an ML prediction service. This UI may allow for a user to enter and/or upload a data package that may include ML model artifacts, such as those outputs caused from training data used to train the layers of the ML mode, as well as a requirements file and test data used to validate the ML model. This may be done from a ML prediction service that includes a ML prediction engine hosted on an online digital platform of a service provider. The ML prediction engine may utilize a ML model deployer that deploys the ML model uploaded through the data package in a three-phase process. At block 604, during a first phase of a ML model deployment, the data package for the ML model is received via the UI. This may correspond to a registration phase, where ML model artifacts and ML model metadata (e.g., a description, version, required programming codes, and the like, as well as the requirements file and/or test data, in some embodiments) may be stored to one or more data repositories, and the ML model is registered with the ML prediction service.

At block 606, during a second phase of the ML model deployment, the ML model is validated to be supported by the ML prediction service. Validation for support of the ML model by the ML prediction service may include using the requirements file to determine whether the ML prediction engine has the proper code packages and/or ML model frameworks required by the ML model in order to host and execute the ML model. If the ML prediction service can properly execute the ML model using the available software and/or hardware resources available to the ML prediction engine, at block 608, during the second phase, test predictions and test explanations are validated as resulting from test features processed by the ML model when run by the ML prediction service. For example, the ML model may be executed in a live or test production computing environment provided by the ML prediction service. Using test data for the ML model, which includes test input for test features and resulting test predictions and explanations, the test features may be input to the ML model and processed using the ML prediction engine.

Thereafter, the predictions that result from the input test features may be compared to the test predictions in a data file for the test data to determine if the predictions are consistent and the ML model is behaving correctly. Further, where the ML model has a corresponding ML model explainer that provides explanations of predictions by the ML model, explanations of those predictions may also be determined and compared to the test explanations in the data file for the test data. One or more columns of a data table for the test data file may be designated for and include the test features, while another column may be designated for and include the test prediction. A further column may be designated for and include the explanation of the test prediction to allow for comparison.

If the ML model is registered and validated, the user or client may then request that the ML model be deployed. At block 610, during a third phase of the ML model deployment, a deployment request is submitted, such as by the user or client, for the ML model to be deployed with the ML prediction service. At certain intervals, the ML prediction engine may poll for deployment requests, and if detected, may update and register service metadata with ML model metadata designating the ML model as deployed and available for use. Further, the ML prediction engine may retrieve ML model artifacts from a repository, and at block 612, deploy and host the ML model with the ML prediction service. Thereafter, the ML model may be available for use and predictive services. Further, the user/client may also request that the ML model be un-deployed, which may remove the ML model from the production computing environment. This may be performed immediately and in real-time without compromising the production computing environment by removing in the particular instance and other instances running of the ML prediction engine.

Figure 7:
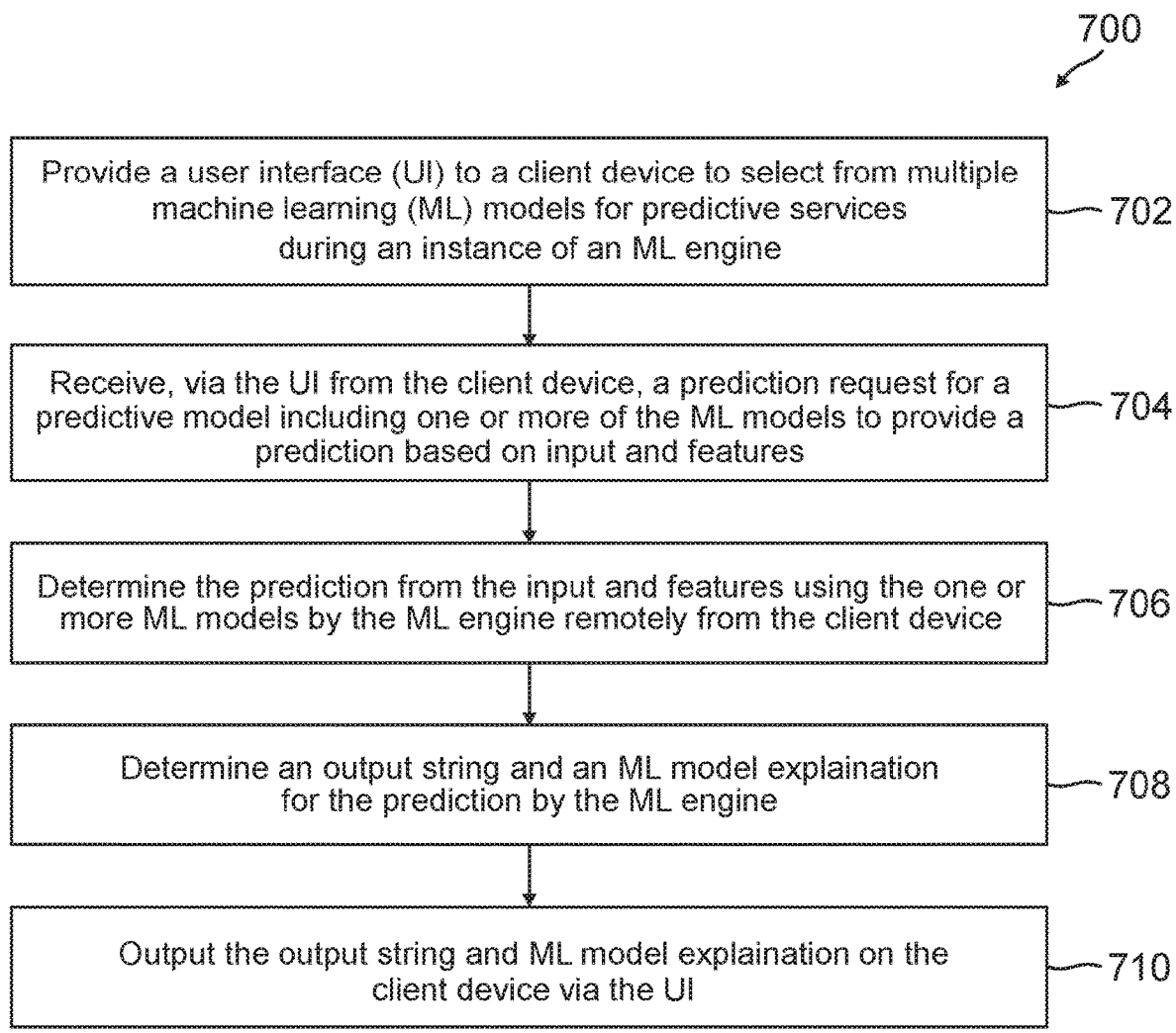
FIG. 7 is a flowchart for a shared prediction engine for machine learning model deployment, according to an embodiment.

FIG. 7 is a flowchart 700 for a shared prediction engine for machine learning model deployment, according to an embodiment. At block 702 of flowchart 700, a user interface (UI) is provided to a client device to enable the client device to select from multiple machine learning (ML) models for predictive services during an instance of an ML engine. The ML engine may provide predictive services via a predictive model that includes one or more ML models using prediction service for a service provider. The ML engine may host multiple predictive ML models via an online digital platform of the service provider, where instances of the ML engine may be provided to different client devices. Each instance may provide a computing environment that allow client devices to remote request access to and use of the ML models for predictive services, such as over a network connection with the ML engine's online platform. In this regard, the ML models may be hosted remotely and provided through backend integrations with client devices and systems that allow of input strings of data to request predictive services by selecting one or more of the ML models and providing the input data and features for the ML model(s) to process.

At block 704, a prediction request for a prediction model including one or more of the ML models is received to provide a prediction based on input and features, where the prediction request corresponds to a data request to process some input based on the corresponding features using the selected ML model(s). The prediction request may correspond to an input string in a certain format and/or data structure. The structure for the input string may also be compatible with different ML frameworks, such as Tensorflow, Scikit-Learn, Python or Java H2O, and the like. The prediction request may select a predictive model that includes multiple ML models such that the prediction request may be processed in a single thread, if necessary, to ensure thread safety. For example, multiple ML models may be run in the single thread to avoid unintended interactions and ensure proper behavior of each model. This may be done in the instance provided to the client device, where multiple different instances of the ML model may be provided to multiple different client devices to allow concurrent running of ML models, however, in different threads within those instances.

At block 706, the prediction from the input and features is determined using the one or more ML models by the ML engine remotely from the client device. The prediction may be determined using the ML engine via the online platform of the service provider during the instance of the ML engine being provided to the client device. In this regard, the prediction may correspond to a single ML prediction, where the prediction model includes one ML model. However, where the client device selects a prediction model that includes multiple ML models available for predictive services via the ML engine, multiple ML model may be run, for example, to compare consistencies and/or accuracies of ML models, determine a weighted average outputs, and/or determine a sum, average, or total number of corresponding outputs (e.g., fraud or risk detection and/or scores). Further, when determining the prediction(s), a ML model explainer may be invoked that is associated with one or more of the ML models, which may determine one or more corresponding explanations of the prediction(s). Each explanation may provide the features and corresponding weights of those features in the output prediction(s).

At block 708, an output string and an ML model explanation (where provided) for the prediction is determined by the ML engine. The output string may be provided and formatted in a corresponding same or similar structure to the input string for the prediction request. In this regard, by utilizing the same or similar formatting and structures for the input and output strings, faster and optimized communications between client devices and the ML engine may be provided, which may reduce latency between systems. Thereafter, the output string and the ML model explanation for the prediction are output to the client device via the UI, at block 710. The UI may thereafter present the prediction and explanation from the selected ML model(s) during the instance of the ML engine being provided to the client device.

Figure 8:
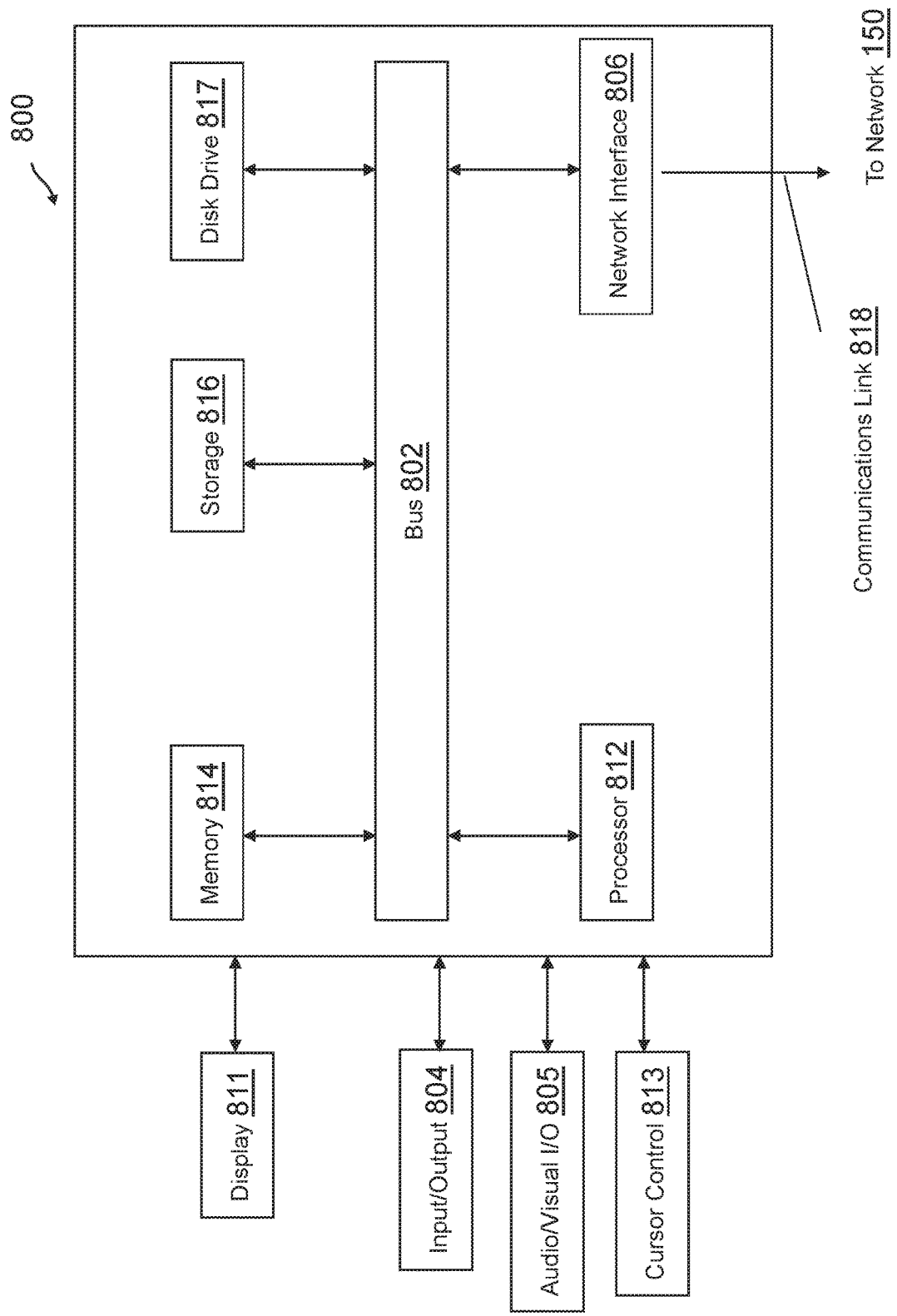
FIG. 8 is a block diagram of a computer system suitable for implementing one or more components in FIG. 1, according to an embodiment.

FIG. 8 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons, image, or links, and/or moving one or more images, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another communication device, service device, or a service provider server via network 150. In one embodiment, the transmission is wireless, although other transmission mediums and methods may also be suitable. One or more processors 812, which can be a micro-controller, digital signal processor (DSP), or other processing component, processes these various signals, such as for display on computer system 800 or transmission to other devices via a communication link 818. Processor(s) 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor(s) 812 and other components by executing one or more sequences of instructions contained in system memory component 814. Logic may be encoded in a computer readable medium, which may refer to any medium that participates in providing instructions to processor(s) 812 for execution. Such a medium may take many forms, including but not limited to, non-volatile media, volatile media, and transmission media. In various embodiments, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a processor; and a non-transitory computer-readable medium having stored thereon instructions that are executable to cause the system to perform operations comprising:
  causing a graphical user interface to be displayed to a client device of a user, wherein the graphical user interface is configured to allow the user to make a selection of a particular machine learning (ML) model from a plurality of ML models;
  receiving a prediction request associated with the plurality of ML models, wherein the prediction request has corresponding associated data comprising an identity of a first ML model of the plurality of ML models, first input data for the first ML model, and first feature data for the first ML model;
  determining, by an ML prediction engine using the first ML model, a prediction for the prediction request, wherein the prediction comprises an output based on the first input data and the first feature data, and wherein the ML prediction engine was trained by a process including:
    determining a plurality of ML model prediction explanations for the plurality of ML models using test data for the plurality of ML models;
    comparing the plurality of ML model prediction explanations to at least one test explanation generated based on the test data with a test ML model associated with the plurality of ML models; and
    determining a plurality of ML model statuses for the plurality of ML models during deployments of the plurality of ML models with the ML prediction engine based on the comparing; and
  outputting the prediction to the client device via the graphical user interface.

2. The system of claim 1, wherein the first ML model is hosted by the ML prediction engine and wherein the ML prediction engine is separate from the client device.

3. The system of claim 1, wherein the operations further comprise:
  receiving, from the client device, information indicating a user-specified machine learning model; and
  adding the user-specified machine learning model to the plurality of ML models.

4. The system of claim 3, wherein the operations further comprise:
  causing an option to be presented, via the graphical user interface, allowing the selection of the user-specified machine learning model for the prediction via the ML prediction engine.

5. The system of claim 1, wherein the operations further comprise:
  providing the plurality of ML model statuses to the client device via the graphical user interface.

6. The system of claim 1, wherein the outputted prediction further comprises a textual explanation corresponding to a result of the outputted prediction.

7. The system of claim 1, wherein the prediction request may is compatible with a programming language of the ML prediction engine.

8. The system of claim 1, wherein the prediction request includes at least one of a name or directory designation of a target ML model.

9. A non-transitory computer-readable medium having stored thereon instructions executable by a computer system to cause the computer system to perform operations comprising:
  causing a graphical user interface to be displayed to a client device of a user, wherein the graphical user interface is configured to allow the user to make a selection of a particular machine learning (ML) model from a plurality of ML models;
  receiving a prediction request associated with the plurality of ML models, wherein the prediction request has corresponding associated data comprising an identity of a first ML model of the plurality of ML models, first input data for the first ML model, and first feature data for the first ML model;
  determining, by an ML prediction engine using the first ML model, a prediction for the prediction request, wherein the prediction comprises an output based on the first input data and the first feature data, and wherein the ML prediction engine was trained by a process including:
    determining a plurality of ML model prediction explanations for the plurality of ML models using test data for the plurality of ML models;
    comparing the plurality of ML model prediction explanations to at least one test explanation generated based on the test data with a test ML model associated with the plurality of ML models; and
    determining a plurality of ML model statuses for the plurality of ML models during deployments of the plurality of ML models with the ML prediction engine based on the comparing; and
  outputting the prediction to the client device via the graphical user interface.

10. The non-transitory computer-readable medium of claim 9, wherein the operations further comprise outputting the prediction in a particular data structure corresponding to a particular file format.

11. The non-transitory computer-readable medium of claim 9, wherein the operations further comprise:
  receiving, from the client device, information indicating a user-specified machine learning model; and
  adding the user-specified machine learning model to the plurality of ML models.

12. The non-transitory computer-readable medium of claim 11, wherein the operations further comprise:
  causing an option to be presented, via the graphical user interface, allowing the selection of the user-specified machine learning model for the prediction via the ML prediction engine.

13. The non-transitory computer-readable medium of claim 9, wherein the operations further comprise:
  providing the plurality of ML model statuses to the client device via the graphical user interface.

14. A method, comprising:
  causing, by a computer system, a graphical user interface to be displayed to a client device of a user, wherein the graphical user interface is configured to allow the user to make a selection of a particular machine learning (ML) model from a plurality of ML models;
  receiving, by the computer system, a prediction request associated with the plurality of ML models, wherein the prediction request has corresponding associated data comprising an identity of a first ML model of the plurality of ML models, first input data for the first ML model, and first feature data for the first ML model;
  determining, by an ML prediction engine using the first ML model, a prediction for the prediction request, wherein the prediction comprises an output based on the first input data and the first feature data, and wherein the ML prediction engine was trained by a process including:

determining a plurality of ML model prediction explanations for the plurality of ML models using test data for the plurality of ML models;

comparing the plurality of ML model prediction explanations to at least one test explanation generated based on the test data with a test ML model associated with the plurality of ML models; and determining a plurality of ML model statuses for the plurality of ML models during deployments of the plurality of ML models with the ML prediction engine based on the comparing; and outputting, by the computer system, the prediction to the client device via the graphical user interface.

15. The method of claim 14, wherein the prediction request includes associated data comprising at least one of a plurality of numbers, a plurality of strings, or a plurality of boolean variables.

16. The method of claim 14, wherein the first ML model is hosted by the ML prediction engine and wherein the ML prediction engine is separate from the client device.

17. The method of claim 14, further comprising:

receiving, from the client device, information indicating a user-specified machine learning model; and adding the user-specified machine learning model to the plurality of ML models.

18. The method of claim 17, further comprising:

causing an option to be presented, via the graphical user interface, allowing the selection of the user-specified machine learning model for the prediction via the ML prediction engine.

19. The method of claim 14, wherein the outputted prediction further comprises a textual explanation corresponding to a result of the outputted prediction.

20. The method of claim 14, wherein the prediction request includes at least one of a name or directory designation of a target ML model.

* * * * *